B. PRICE.
Side-Hill Plow.
No. 56,798
Patented July 31, 1866.
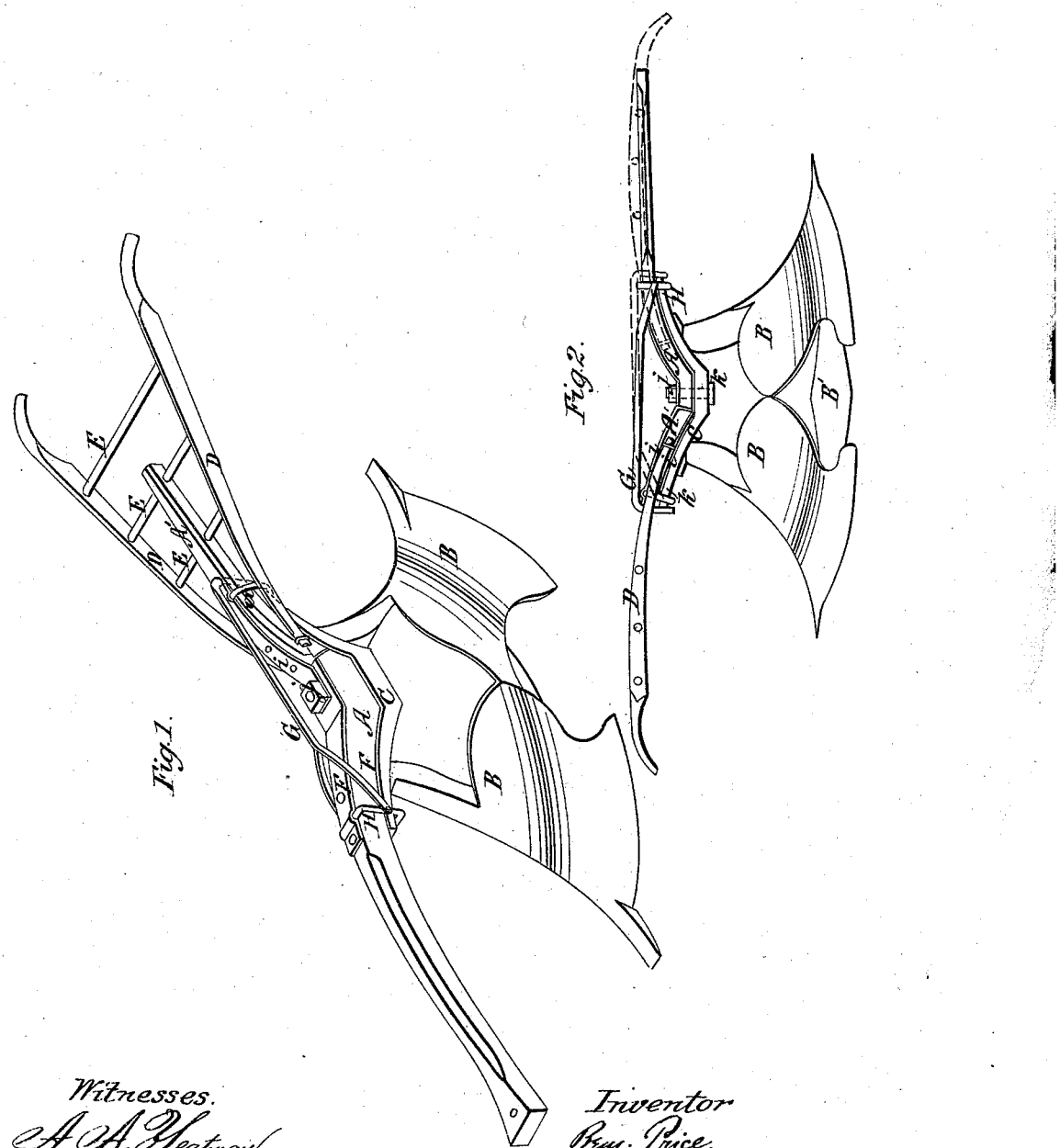

UNITED STATES PATENT OFFICE.

BENJAMIN PRICE, OF LEESVILLE, OHIO.

IMPROVEMENT IN PLOWS.

Specification forming part of Letters Patent No. 56,798, dated July 31, 1866.

*To all whom it may concern:*

Be it known that I, BENJAMIN PRICE, of Leesville, Carroll county, in the State of Ohio, have invented certain new and useful Improvements in Plows; and I do hereby declare that the following is a full, clear, and exact description thereof, reference being had to the accompanying drawings, and to the letters of reference thereon marked, making a part of this specification.

In the drawings, Figure 1 is a side view, on the side where the sod is turned, the plow being in position for plowing. Fig. 2 is a side view on the same side as shown in Fig. 1, and representing the arrangement of the jointed beam.

The nature of my invention consists in making a hill-side plow so that by reversing the position of the beam the running of the plow is reversed. Also, the construction of the plow is such that while the front plow is doing its work the rear plow is lifted out of the ground, thereby avoiding the friction in carrying the same.

To enable others skilled in the art to make and use my invention, I will describe its construction and operation.

In constructing my plow I use any of the materials that are commonly used in the construction of plows.

In the drawings, Fig. 1, A is the front end of the beam, and A' the rear end, the beam being constructed in two pieces. They are joined together by plates *i i* by means of bolt *k*, Fig. 2, and nut *j*. C is the head-piece of the plow, of a shape best suited to my purpose, and at its middle about one-fourth of it is straight, at which point the beam is attached by bolt *k* and nut *j*, as above described. The two ends are raised up and slightly curved from the middle straight piece. The beam is made of a shape to correspond with curve of the ends onto which it fits, and is easily turned when desired.

D D are the handles, with rungs E, which pass through the end of the beam A', each of their ends secured to the handles and binding them firmly together; F F, plates on beam A. They give greater strength to the end through which the bolt *k* passes and on which the beam turns; G, the lever, bent nearly at right angles at its rear end, which end fits into a hole in the rear end of the beam. The front end of the lever is forked and attached to the device H.

The lever G and device H are for the purpose of binding the beam and plow together.

B B are the plows.

In Fig. 2 like parts are designated by like letters as those used in Fig. 1; B', the land-bar, extending between the plows or mold-boards and points.

It will be seen that the rear plow (Fig. 1, when the front plow is at work, is raised out of the ground and does not drag on it, thus entirely avoiding any friction in carrying it, which is of great advantage in such plows.

In the operation of my invention the beam is firmly secured to the head-piece of the plow C by means of bolt *k*, around which the beam revolves, also by devices H and *a*, which move on hinges. H is drawn down end of the head-piece C. The hook portion of lever G is pressed into the end of the beam A', while device *a* is pushed over the other end of the beam C, thus securing the whole plow firmly together.

When the plow is to make a return furrow the lever G is raised and pushed forward, thus sliding the device H off the beam C. The device *a* is then drawn back. By those means the frame is detached from the head-piece or beam C.

The horses or team is made to turn around to the furrow, causing the beam and handles to change their relative position to the plow, and is again attached as before, when it is ready to make the return furrow.

The peculiar advantages of my invention consist in the construction of a hill-side plow so that when one plow or mold-board and point are in the ground cutting a furrow, the rear plow or mold-board and point are raised or tilted up out of the ground to a height corresponding to the depth of the cutting or front part of the plow, thus causing it to run clear of the ground, and thereby avoiding all friction of the rear plow.

Having thus fully described my invention, what I claim as new, and desire to secure by Letters Patent, is as follows:

The jointed beam A A', attached to a front and rear mold-board and points or hill-side plow, constructed and operating substantially in the manner and for the purposes set forth.

In testimony that I claim the above I hereunto set my hand.

BENJAMIN PRICE.

In presence of—
HENRY ALLENSWORTH,
R. N. LIEBICK.